United States Patent
Koyama (10) Patent No.: US 8,817,351 B2
(45) Date of Patent: Aug. 26, 2014

(54) OPTICAL DEFLECTOR INCLUDING PIEZOELECTRIC SENSOR ON FIXED FRAME

(75) Inventor: Takaaki Koyama, Kanagawa (JP)

(73) Assignee: Stanley Electric Co., Ltd., Tokyo (JP)

( * ) Notice: Subject to any disclaimer, the term of this patent is extended or adjusted under 35 U.S.C. 154(b) by 62 days.

(21) Appl. No.: 13/484,703

(22) Filed: May 31, 2012

(65) Prior Publication Data

US 2012/0327494 A1 Dec. 27, 2012

(30) Foreign Application Priority Data

Jun. 22, 2011 (JP) ................... 2011-138622

(51) Int. Cl.
*G02B 26/08* (2006.01)
(52) U.S. Cl.
USPC ....................................... 359/200.8

(58) Field of Classification Search
CPC .......... G02B 26/0816; G02B 26/0825; G02B 26/0833; G02B 26/0858; G02B 26/0841
USPC ........... 359/199.1, 212.1–214.1, 223.1–226.1
See application file for complete search history.

(56) References Cited

U.S. PATENT DOCUMENTS 7,630,112 B2 *  12/2009  Mizumoto ................. 359/199.1
2011/0292479 A1   12/2011  Hiraoka et al.

FOREIGN PATENT DOCUMENTS

JP         2010-122480 A       6/2010

* cited by examiner

*Primary Examiner* — Euncha Cherry
(74) *Attorney, Agent, or Firm* — Kenealy Vaidya LLP (57) ABSTRACT

In an optical deflector including a mirror, a fixed frame, and a piezoelectric actuator connected to the fixed frame for rocking the mirror with respect to an axis of the mirror, at least one piezoelectric sensor is provided on the fixed frame to sense a rocking vibration of the mirror caused by the piezoelectric actuator.

15 Claims, 10 Drawing Sheets

OPTICAL DEFLECTOR INCLUDING PIEZOELECTRIC SENSOR ON FIXED FRAME

This application claims the priority benefit under 35 U.S.C. §119 to Japanese Patent Application No. JP2011-138622 filed on Jun. 22, 2011, which disclosure is hereby incorporated in its entirety by reference.

BACKGROUND

1. Field

The presently disclosed subject matter relates to an optical deflector including sense elements (piezoelectric sensors).

2. Description of the Related Art

A prior art two-dimensional optical deflector is constructed by a mirror, a movable frame surrounding the mirror for supporting the mirror, a pair of meander-type inner piezoelectric actuators fixed between the movable frame and the mirror and serving as cantilevers for rocking the mirror with respect to an X-axis of the mirror, a fixed frame surrounding the movable frame, and a pair of meander-type outer piezoelectric actuators fixed between the fixed frame and the movable frame and serving as cantilevers for rocking the mirror through the movable frame with respect to a Y-axis of the mirror perpendicular to the X-axis (see: U.S. Patent Application Publication No. 2011/0292479A1 & JP2010-122480A).

Generally, in an optical scanner, the mirror is rocked with respect to the X-axis for a horizontal deflection at a high frequency, while the mirror is rocked with respect to the Y-axis for a vertical deflection at a low frequency.

In the described prior art two-dimensional optical deflector, each of the piezoelectric actuators includes a drive element and a monitor (sense) element separated from each other by a separation groove. Therefore, when the piezoelectric actuators are driven by their drive elements, the flexing amounts of the piezoelectric actuators are sensed by their sense elements. As a result, the actual flexing amounts of the piezoelectric actuators are controlled by the feedback of the output signals of the sense elements in such a way that the amplitudes of the output signals of the sense elements are brought close to predetermined values. Thus, the deflection of the optical deflector can be controlled with high accuracy.

In the above-described prior art two-dimensional optical deflector, however, since the sense elements are provided in the piezoelectric actuators, the provision of the drive elements in the piezoelectric actuators is decreased so that the rocking forces of the piezoelectric actuators are weakened, thus decreasing the deflection angles of the optical deflector. Also, since long wiring lines are required to be connected to the drive elements, the resistance of the wiring lines is increased, so that the high frequency sense signals from the sense elements cannot be detected.

SUMMARY

The presently disclosed subject matter seeks to solve one or more of the above-described problem.

According to the presently disclosed subject matter, in an optical deflector including a mirror, a fixed frame, and a piezoelectric actuator connected to the fixed frame for rocking the mirror with respect to an axis of the mirror, at least one piezoelectric sensor is provided on the fixed frame to sense a rocking vibration of the mirror caused by the piezoelectric actuator. Since the piezoelectric actuator includes no sense elements, the rocking force of the piezoelectric actuator is strengthened.

Also, the piezoelectric sensor is provided in the vicinity of the piezoelectric actuator. Thus, the piezoelectric sensor easily senses the rocking vibration of the mirror caused by the piezoelectric actuator.

Further, a portion of the fixed frame where the piezoelectric sensor is provided is thinner than a portion of the fixed frame where the piezoelectric sensor is not provided. Thus, the rocking vibration of the sensor caused by the piezoelectric actuator easily propagates through the fixed frame to the piezoelectric sensor.

Still further, a movable frame connected to the piezoelectric actuator opposite to the fixed frame and another piezoelectric actuator connected between the movable frame and the mirror for rocking the mirror with respect to another axis of the mirror are provided, thus realizing a two-dimensional optical deflector. In this case, the piezoelectric sensor is configured to sense a rocking vibration of the mirror caused by the other piezoelectric actuator. Additionally, the other axis is perpendicular to the axis.

BRIEF DESCRIPTION OF THE DRAWINGS

The above and other advantages and features of the presently disclosed subject matter will be more apparent from the following description of certain embodiments, taken in conjunction with the accompanying drawings, wherein.

DETAILED DESCRIPTION OF EXEMPLARY EMBODIMENTS

Figure 1:
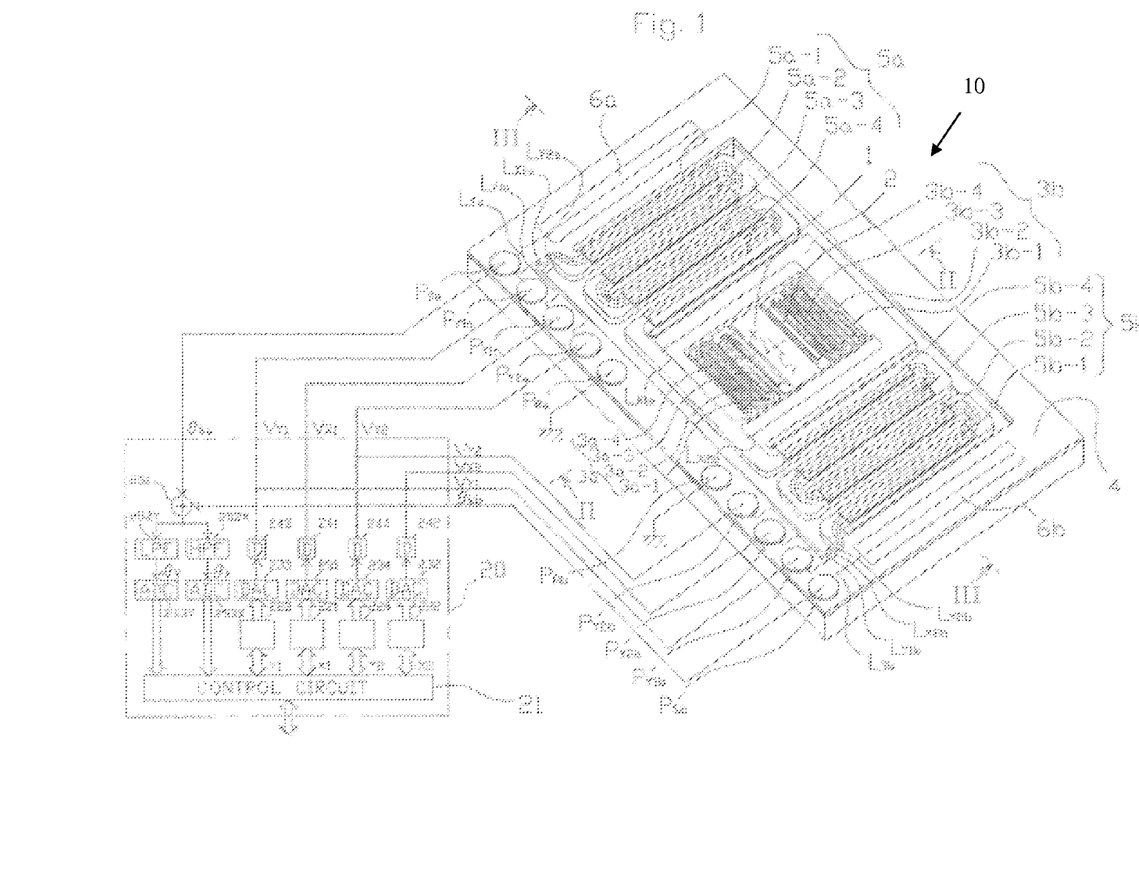
FIG. 1 is a view illustrating a first embodiment of the optical deflector according to the presently disclosed subject matter.

In FIG. 1, which illustrates a first embodiment of the optical deflector according to the presently disclosed subject matter, reference numeral 10 designates a two-dimensional optical deflector, and 20 designates a driver for driving the two-dimensional optical deflector 10.

The optical deflector 10 is constructed by a rectangular mirror 1 for reflecting an incident light, a movable frame 2 surrounding the mirror 1 for supporting the mirror 1, a pair of meander-type inner piezoelectric actuators 3a and 3b fixed between the movable frame 2 and the mirror 1 and serving as cantilevers for rocking the mirror 1 with respect to an X-axis of the mirror 1, a fixed frame 4 surrounding the movable frame 2, a pair of meander-type outer piezoelectric actuators 5a and 5b fixed between the fixed frame 4 and the movable frame 2 and serving as cantilevers for rocking the mirror 1 through the movable frame 2 with respect to a Y-axis of the mirror 1 perpendicular to the X-axis, and piezoelectric sensors 6a and 6b on the fixed frame 4 in the proximity of the outer piezoelectric actuators 5a and 5b, respectively.

Note that the Y-axis of the mirror 1 is accurately perpendicular to the X-axis of the mirror 1; however, the Y-axis does not need to be perpendicular to the X-axis.

The movable frame 2 is rectangularly-framed to surround the mirror 1 associated with the inner piezoelectric actuators 3a and 3b.

The inner piezoelectric actuators 3a and 3b oppose each other with respect to the mirror 1. The inner piezoelectric actuators 3a and 3b have ends coupled to the inner circumference of the movable frame 2 and other ends coupled to the mirror 1, in order to rock the mirror 1 with respect to the X-axis.

The inner piezoelectric actuator 3a is constructed by piezoelectric cantilevers 3a-1, 3a-2, 3a-3 and 3a-4 which are serially-coupled from the movable frame 2 to the mirror 1. Also, each of the piezoelectric cantilevers 3a-1, 3a-2, 3a-3 and 3a-4 are in parallel with the Y-axis of the mirror 1. Therefore, the piezoelectric cantilevers 3a-1, 3a-2, 3a-3 and 3a-4 are folded at every cantilever or meandering from the movable frame 2 to the mirror 1, so that the amplitudes of the piezoelectric cantilevers 3a-1, 3a-2, 3a-3 and 3a-4 can be changed along directions perpendicular to the X-axis of the mirror 1.

Similarly, the inner piezoelectric actuator 3b is constructed by piezoelectric cantilevers 3b-1, 3b-2, 3b-3 and 3b-4 which are serially-coupled from the movable frame 2 to the mirror 1. Also, each of the piezoelectric cantilevers 3b-1, 3b-2, 3b-3 and 3b-4 are in parallel with the Y-axis of the mirror 1. Therefore, the piezoelectric cantilevers 3b-1, 3b-2, 3b-3 and 3b-4 are folded at every cantilever or meandering from the movable frame 2 to the mirror 1, so that the amplitudes of the piezoelectric cantilevers 3b-1, 3b-2, 3b-3 and 3b-4 can be changed along directions perpendicular to the X-axis of the mirror 1.

Note that the number of piezoelectric cantilevers in the inner piezoelectric actuator 3a and the number of piezoelectric cantilevers in the inner piezoelectric actuator 3b can be other values such as 2, 6, 8, . . . .

The fixed frame 4 is rectangularly-framed to surround the movable frame 2.

The outer piezoelectric actuators 5a and 5b are coupled between the inner circumference of the fixed frame 4 and the outer circumference of the movable frame 2, in order to rock the movable frame 2 associated with the mirror 1 with respect to the fixed frame 4, i.e., to rock the mirror 1 with respect to the Y-axis.

The outer piezoelectric actuator 5a is constructed by piezoelectric cantilevers 5a-1, 5a-2, 5a-3 and 5a-4 which are serially-coupled from the movable frame 2 to the fixed frame 4. Also, each of the piezoelectric cantilevers 5a-1, 5a-2, 5a-3 and 5a-4 are in parallel with the X-axis of the mirror 1. Therefore, the piezoelectric cantilevers 5a-1, 5a-2, 5a-3 and 5a-4 are folded at every cantilever or meandering from the fixed frame 4 to the movable frame 2, so that the amplitudes of the piezoelectric cantilevers 5a-1, 5a-2, 5a-3 and 5a-4 can be changed along directions perpendicular to the Y-axis of the mirror 1.

Similarly, the outer piezoelectric actuator 5b is constructed by piezoelectric cantilevers 5b-1, 5b-2, 5b-3 and 5b-4 which are serially-coupled from the movable frame 2 to the fixed frame 4. Also, each of the piezoelectric cantilevers 5b-1, 5b-2, 5b-3 and 5b-4 are in parallel with the X-axis of the mirror 1. Therefore, the piezoelectric cantilevers 5b-1, 5b-2, 5b-3 and 5b-4 are folded at every cantilever or meandering from the fixed frame 5 to the movable frame 2, so that the amplitudes of the piezoelectric cantilevers 5b-1, 5b-2, 5b-3 and 5b-4 can be changed along directions perpendicular to the Y-axis of the mirror 1.

Note that the number of piezoelectric cantilevers in the outer piezoelectric actuator 5a and the number of piezoelectric cantilevers in the outer piezoelectric actuator 5b can be other values such as 2, 6, 8, . . . .

The piezoelectric sensors 6a and 6b sense deflection angle signals $\theta_{Sa}$ and $\theta_{Sb}$, respectively, of the mirror 1.

Provided on the fixed frame 4 are pads $P_{Ra}$, $P_{Y2a}$, $P_{X1a}$, $P_{Y1a}$ and $P_{Sa}$, $P_{Rb}$, $P_{Y2b}$, $P_{X2b}$, $P_{Y1b}$ and $P_{Sb}$. The pads $P_{Y2a}$, $P_{X1a}$, $P_{Y1a}$, $P_{Sa}$, $P_{Y2b}$, $P_{X2b}$, $P_{Y1b}$ and $P_{Sb}$ are connected to the driver 20.

Figure 2:
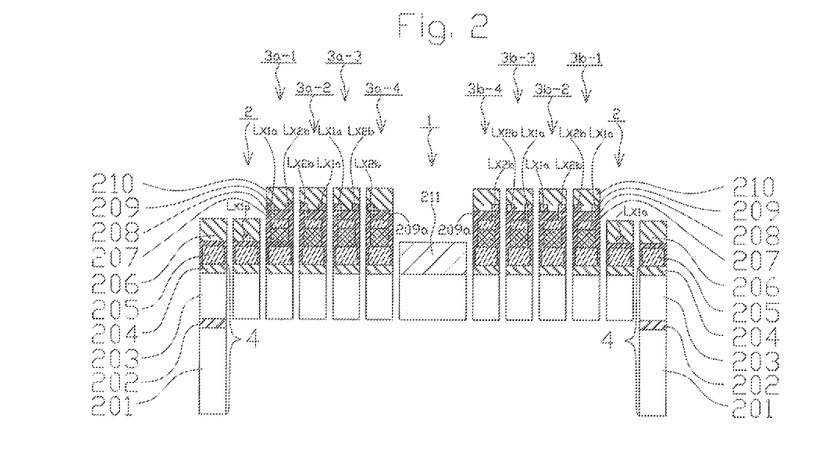
FIG. 2 is a cross-sectional view taken along the line II-II in FIG. 1.
Figure 3:
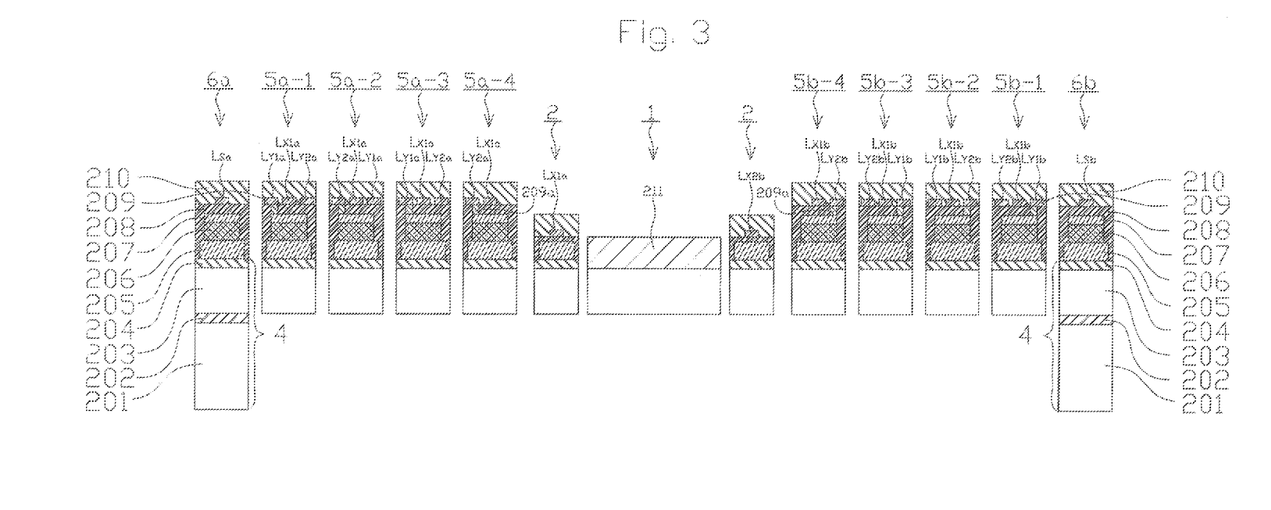
FIG. 3 is a cross-sectional view taken along the line III-III in FIG. 1.

The pad $P_{Ra}$ for receiving a reference voltage V, is connected via via-structures (not shown) to the lower electrode layers 207 (see: FIG. 2) of the piezoelectric cantilevers 3a-1, 3a-2, 3a-3 and 3a-4 of the inner piezoelectric actuator 3a, the lower electrode layers 205 (see: FIG. 3) of the piezoelectric cantilevers 5a-1, 5a-2, 5a-3 and 5a-4 of the outer piezoelectric actuator 5a, and the lower electrode layer 205 (see: FIG. 3) of the piezoelectric sensor 6a. In this case, the pad $P_{Ra}$ is grounded, i.e., the reference voltage $V_R$ is 0V.

The pad $P_{Y2a}$ is connected via a wiring line $L_{Y2a}$ to the upper electrode layers 207 (see: FIG. 3) of the even-numbered piezoelectric cantilevers 5a-2 and 5a-4 of the outer piezoelectric actuator 5a.

The pad $P_{X1a}$ is connected via a wiring line $L_{X1a}$ to the upper electrode layers 207 (see: FIG. 2) of the odd-numbered piezoelectric cantilevers 3a-1 and 3a-3 of the inner piezoelectric actuator 3a and the upper electrode layers 207 (see: FIG. 2) of the odd-numbered piezoelectric cantilevers 3a-1 and 3a-3 of the inner piezoelectric actuator 3b.

The pad $P_{Y1a}$ is connected via a wiring line $L_{Y1a}$ to the upper electrode layers 207 (see: FIG. 3) of the odd-numbered piezoelectric cantilevers 5a-1 and 5a-3 of the outer piezoelectric actuator 5a.

The pad $P_{Sa}$ is connected via a wiring line $L_{Sa}$ to the upper electrode layer 207 (see: FIG. 3) of the piezoelectric sensor 6a.

The pad $P_{Rb}$ for receiving the reference voltage is connected via via-structures (not shown) to the lower electrode layers 205 (see: FIG. 2) of the piezoelectric cantilevers 3b-1, 3b-2, 3b-3 and 3b-4 of the inner piezoelectric actuator 3b, the lower electrode layers 205 (see: FIG. 3) of the piezoelectric cantilevers 5b-1, 5b-2, 5b-3 and 5b-4 of the outer piezoelectric actuator 5b, and the lower electrode layer 205 (see: FIG. 3) of the piezoelectric sensor 6b. In this case, since the reference voltage $V_R$ is 0V, the pad $P_{Rb}$ is grounded.

The pad $P_{Y2b}$ is connected via a wiring line $L_{Y2b}$ to the upper electrode layers 207 (see: FIG. 3) of the even-numbered piezoelectric cantilevers 5b-2 and 5b-4 of the outer piezoelectric actuator 5b.

The pad $P_{X1b}$, is connected via a wiring line $L_{X1b}$ to the upper electrode layers 207 (see: FIG. 2) of the even-numbered piezoelectric cantilevers 3a-2 and 3a-4 of the inner piezoelectric actuator 3a and the upper electrode layers 207 (see: FIG. 3) of the even-numbered piezoelectric cantilevers 3b-2 and 3b-4 of the inner piezoelectric actuator 3b.

The pad $P_{Y1b}$ is connected via a wiring line $L_{Y1b}$ to the upper electrode layers 207 (see: FIG. 3) of the odd-numbered piezoelectric cantilevers 5a-1 and 5a-3 of the outer piezoelectric actuator 5b.

The pad $P_{Sb}$ is connected via a wiring line $L_{Sb}$ to the upper electrode layer 207 (see: FIG. 3) of the piezoelectric sensor 6b.

The driver 20 is constructed by a control circuit 21 such as a microcomputer including a central processing unit (CPU), a read-only memory (ROM) or a nonvolatile memory, a random access memory (RAM), an input/output (I/O) interface and the like.

The driver 20 includes a nonvolatile memory 221 for storing drive data X1 for driving the upper electrode layers of the odd-numbered piezoelectric cantilevers 3a-1 and 3a-3; 3b-1 and 3b-3, a digital-to-analog converter (DAC) 231 for converting the drive data X1 into a drive voltage $V_{X1}$, and a drive circuit 241 for applying the drive voltage $V_{X1}$ to the pad $P_{X1a}$.

The driver 20 further includes a nonvolatile memory 222 for storing drive data X2 for driving the upper electrode layers of the even-numbered piezoelectric cantilevers 3a-2 and 3a-4; 3b-2 and 3b-4, a digital-to-analog converter (DAC) 232 for converting the drive data X2 into a drive voltage $V_{X2}$, and a drive circuit 242 for applying the drive voltage $V_{X2}$ to the pad $P_{X2b}$.

The driver 20 further includes a nonvolatile memory 223 for storing drive data Y1 for driving the upper electrode layers of the odd-numbered piezoelectric cantilevers 5a-1 and 5a-3; 5b-1 and 5b-3, a digital-to-analog converter (DAC) 233 for converting the drive data Y1 into a drive voltage $V_{Y1}$, and a drive circuit 243 for applying the drive voltage $V_{Y1}$ to the pads $P_{Y1a}$ and $P_{Y1b}$.

The driver 20 further includes a nonvolatile memory 224 for storing drive data Y2 for driving the upper electrode layers of the even-numbered piezoelectric cantilevers 5a-2 and 5a-4; 5b-2 and 5b-4, a digital-to-analog converter (DAC) 234 for converting the drive data Y2 into a drive voltage $V_{Y2}$, and a drive circuit 244 for applying the drive voltage $V_{Y2}$ to the pads $P_{Y2a}$ and $P_{Y2b}$.

The driver 20 further includes a summing amplifier 251 for amplifying the sum of the analog deflection angle signals $\theta_{Sa}$ and $\theta_{Sb}$ of the mirror 1 from the pads $P_{Sa}$ and $P_{Sb}$ a high pass filter (HPF) (or a band pass filter (BPF)) 252X for passing a frequency component $f_X$ of the analog deflection angle signals $\theta_{Sa}$ and $\theta_{Sb}$ to generate an analog deflection angle $\theta_X$ excluding the frequency component $f_Y$, a low pass filter (LPF) (or a band pass filter (BPF)) 252Y for passing a frequency component $f_Y$ of the analog deflection angle signals $\theta_{Sa}$ and $\theta_{Sb}$ to generate an analog deflection angle signal $\theta_Y$ excluding the frequency component $f_X$, and analog-to-digital converters (ADC) 253X and 253Y for converting the analog deflection angle signals $\theta_X$ and $\theta_Y$ into digital deflection angle data.

As stated above, the piezoelectric sensors 6a and 6b are provided in the proximity of the outer piezoelectric actuators 5a and 5b, respectively, so that the piezoelectric sensors 6a and 6b could be easily flexed by the outer piezoelectric actuators 5a and 5b. Therefore, the analog deflection angle signals $\theta_{Sa}$ and $\theta_{Sb}$ mainly include the frequency component $f_Y$ such as 60 Hz caused by the outer piezoelectric actuators 5a and 5b; however, even in this case, small amounts of the frequency component $f_X$ such as 30 kHz caused by the inner piezoelectric actuators 3a and 3b would propagate via the movable frame 2 to the piezoelectric sensors 6a and 6b, so that the piezoelectric sensors 6a and 6b would also be flexed by the inner piezoelectric actuators 3a and 3b. Therefore, each of the analog deflection angle signals $\theta_{Sa}$ and $\theta_{Sb}$ can be represented by $$\theta_{Sa} \propto \theta_X + \theta_Y$$

$$\theta_{Sb} \propto \theta_X + \theta_Y$$

Therefore, the high pass filter 252X can generate the analog deflection angle signal $\theta_X$ whose amplitude is relatively small and the low pass filter 252Y can generate the analog deflection angle signal $\theta_Y$ whose amplitude is relatively large.

The structure of each element of the optical deflector 10 is explained next with reference to FIGS. 2 and 3 which are cross-sectional views taken along the II-II line and the III-III line, respectively, in FIG. 1.

In FIGS. 2 and 3, a monocrystalline silicon support layer 201, an intermediate silicon dioxide layer 202 and a monocrystalline silicon active layer 203 are formed by a silicon-on-insulator (SOI) substrate. Also, reference numeral 204 designates a silicon dioxide layer, 205 designates a lower electrode layer of a double layer made of Ti, $TiO_2$ or $TiO_X$ (0<x<2) and Pt, $LaNiO_2$ or $SrRuO_2$, 206 designates a lead titanate zirconate (PZT) layer, 207 designates an upper electrode layer made of Pt, Au or the like, 208 designates an insulating interlayer made of silicon oxide or the like, 209 designates a wiring layer made of Pt, Au, Al or aluminum alloy, 209a designates a via-structure within the insulating layer 208 for electrically connecting the wiring layer 209 to the upper electrode layer 207, 210 designates a passivation layer made of silicon dioxide and/or silicon nitride, and 211 designates an about 100 to 500 nm metal layer made of Al, Ag, Au, Pt or the like.

The mirror 1 is constructed by the monocrystalline silicon active layer 203 serving as a vibration plate and the metal layer 211 serving as a reflector.

The movable frame 2 is constructed by the monocrystalline silicon active layer 203 and the silicon dioxide layer 204.

Each of the piezoelectric cantilevers 3a-1 to 3a-4 and 3b-1 to 3b-4 and the piezoelectric cantilevers 5a-1 to 5a-4 and 5b-1 to 5b-4 and the piezoelectric sensors 6a and 6b is constructed by the monocrystalline silicon active layer 203, the silicon dioxide layer 204, the lower electrode layer 205, the PZT layer 206 and the upper electrode layer 207.

The fixed frame 4 is constructed by the monocrystalline silicon layer 201, the intermediate silicon layer 202, the monocrystalline silicon active layer 203 and the silicon dioxide layer 204.

The pads $P_{Ra}$, $P_{Y2a}$, $P_{X1a}$, $P_{Y1a}$, $P_{Sa}$, $P_{Rb}$, $P_{Y2b}$, $P_{X2b}$, $P_{Y1b}$ and $P_{Sb}$ and the wiring lines $L_{Y2a}$, $L_{X1a}$, $L_{Y1a}$, $L_{Sa}$, $L_{Y2b}$, $L_{X2b}$, $L_{Y1b}$ and $L_{Sb}$ are constructed by the wiring layer 209.

The meander-type piezoelectric actuators 3a, 3b, 5a and 5b are described below.

In the inner piezoelectric actuators 3a and 3b, the piezoelectric cantilevers 3a-1, 3a-2, 3a-3, 3a-4, 3b-1, 3b-2, 3b-3 and 3b-4 are divided into an odd-numbered group of the piezoelectric cantilevers 3a-1 and 3a-3; 3b-1 and 3b-3, and an even-numbered group of the piezoelectric cantilevers 3a-2 and 3a-4; 3b-2 and 3b-4 alternating with the odd-numbered group of the inner piezoelectric cantilevers 3a-1 and 3a-3; 3b-1 and 3b-3.

Similarly, in the outer piezoelectric actuators 5a and 5b, the piezoelectric cantilevers 5a-1, 5a-2, 5a-3, 5a-4, 5b-1, 5b-2, 5b-3 and 5b-4 are divided into an odd-numbered group of the piezoelectric cantilevers 5a-1 and 5a-3; 5b-1 and 5b-3, and an even-numbered group of the piezoelectric cantilevers 5a-2 and 5a-4; 5b-2 and 5b-4 alternating with the odd-numbered group of the outer piezoelectric cantilevers 5a-1 and 5a-3; 5b-1 and 5b-3.

Figure 4A:
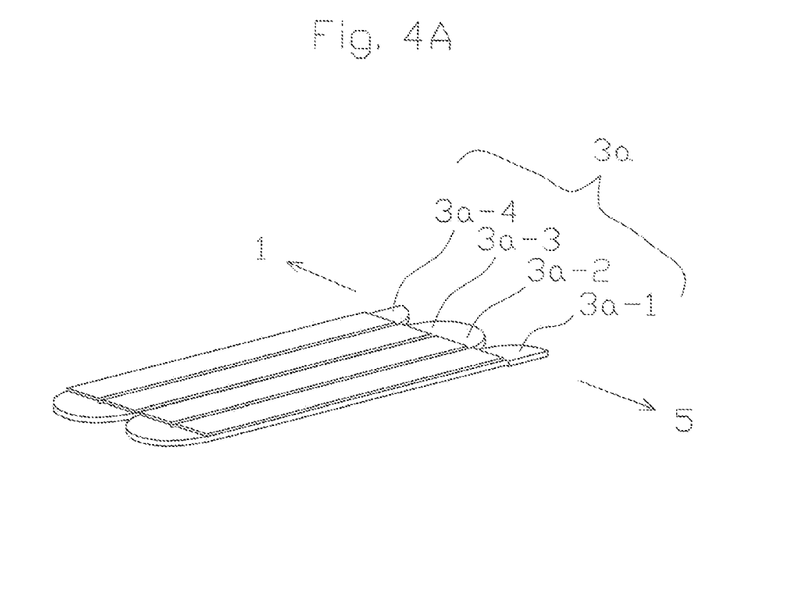
FIGS. 4A and 4B are perspective views for explaining a non-operation state and an operation state, respectively, of the piezoelectric cantilevers of one piezoelectric actuator of FIG. 1.
Figure 4B:
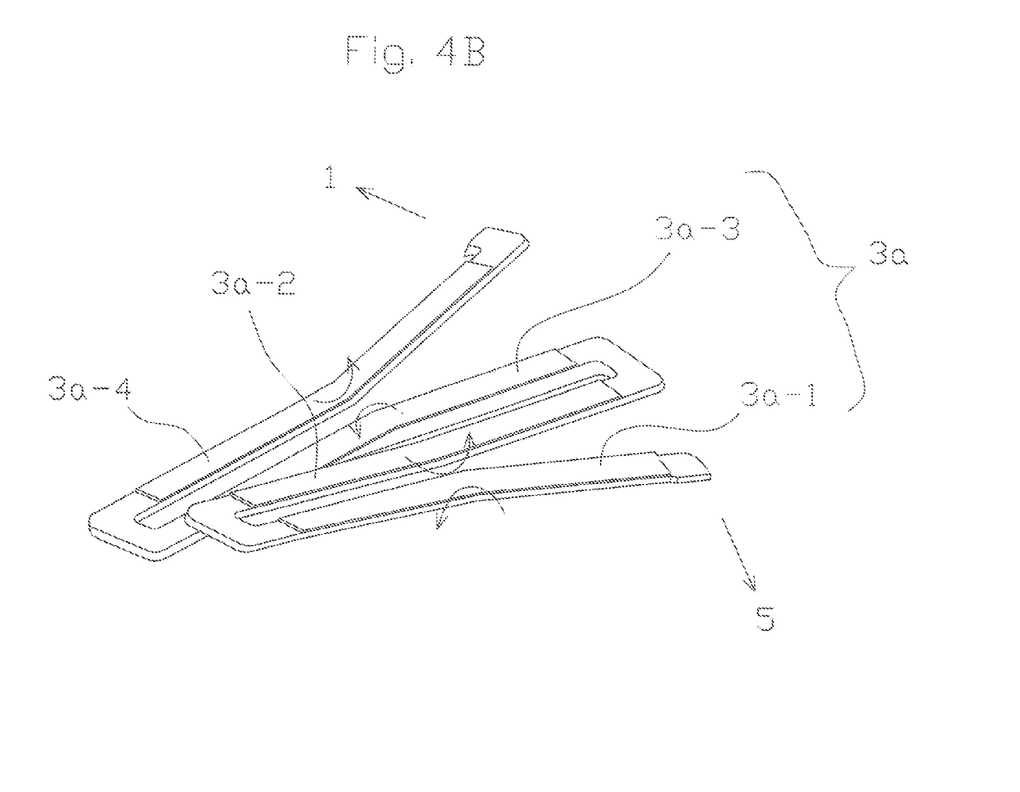

FIGS. 4A and 4B are perspective views for explaining the operation of the piezoelectric cantilevers of one piezoelectric actuator such as 3a of FIG. 1. Note that FIG. 4A illustrates a non-operation state of the piezoelectric cantilevers 3a-1, 3a-2, 3a-3 and 3a-4 of the piezoelectric actuator 3a, and FIG. 4B illustrates an operation state of the piezoelectric cantilevers 3a-1, 3a-2, 3a-3 and 3a-4 of the piezoelectric actuator 3a.

For example, as illustrated in FIG. 4B which illustrates only the piezoelectric cantilevers 3a-1, 3a-2, 3a-3 and 3a-4, when the odd-numbered group of the piezoelectric cantilevers 3a-1, 3a-3, 3b-1 and 3b-3 are flexed in one direction, for example, in a downward direction, the even-numbered group of the piezoelectric cantilevers 3a-2, 3a-4, 3b-2 and 3b-4 are flexed in the other direction, i.e., in an upward direction. On the other hand, when the odd-numbered group of the piezoelectric cantilevers 3a-1, 3a-3, 3b-1 and 3b-3 are flexed in the upward direction, the even-numbered group of the piezoelectric cantilevers 3a-2, 3a-4, 3b-2 and 3b-4 are flexed in the downward direction.

The operation of the piezoelectric cantilevers 5a-1, 5a-2, 5a-3, 5a-4, 5b-1, 5b-2, 5b-3 and 5b-4 is similar to that of the piezoelectric cantilevers 3a-1, 3a-2, 3a-3, 3a-4, 3b-1, 3b-2, 3b-3 and 3b-4. Thus, the mirror 1 is rocked with respect to the Y-axis.

First, an optical deflection or horizontal scanning operation by rocking the mirror 1 with respect to the X-axis is explained in detail with reference to FIGS. 5A, 5B, 5C and 5D.

Figure 5A:
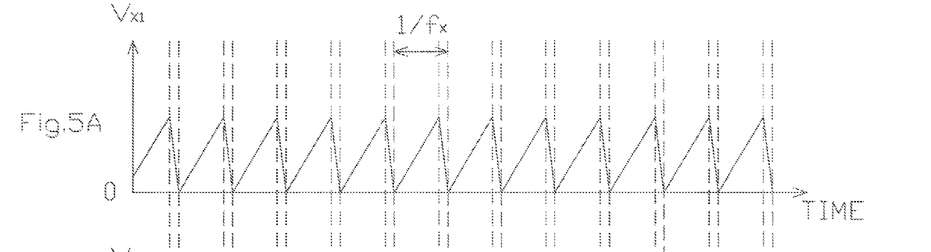
FIGS. 5A, 5B, 5C and 5D are timing diagrams for illustrating examples of the drive voltages $V_{X1}$, $V_{X2}$, the deflection angle signal $\theta_X$ and an actual deflection angle signal $P_X$, respectively, of FIG. 1.
Figure 5B:
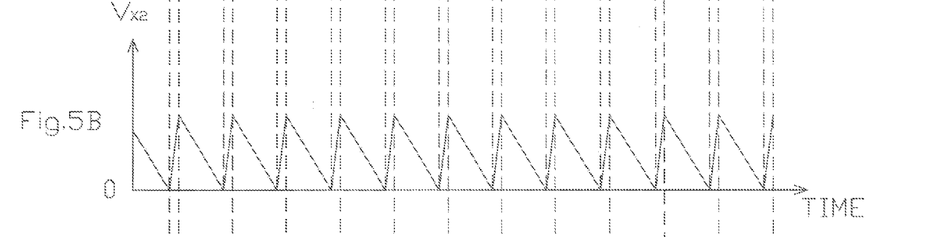

As illustrated in FIGS. 5A and 5B, the drive voltage $V_{X1}$ based upon the drive data X1 stored in advance in the nonvolatile memory 221 and the drive voltage $V_{X2}$ based upon the drive data X2 stored in advance in the nonvolatile memory 222 are saw-tooth-shaped at a predetermined frequency such as 15 kHz and symmetrical or opposite in phase to each other with the reference voltage $V_R$ such as 0V. As a result, the piezoelectric cantilevers 3a-1, 3a-3, 3b-1 and 3b-3 and the piezoelectric cantilevers 3a-2, 3a-4, 3b-2 and 3b-4 carry out flexing operations in opposite directions to each other, so that the mirror 1 is rocked with respect to the X-axis.

Figure 5C:
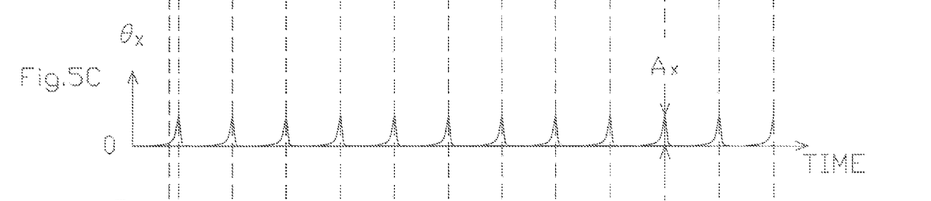
Figure 5D:
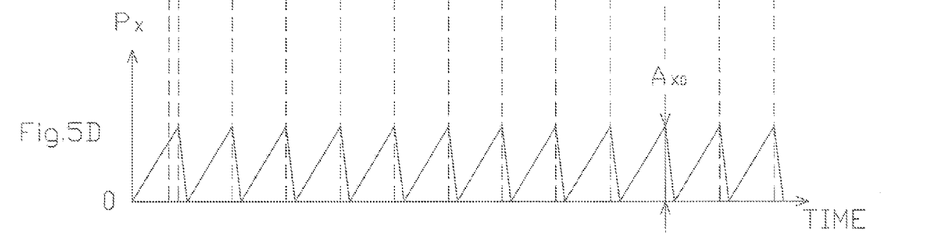

In this case, as illustrated in FIG. 5C, the analog deflection angle signal $\theta_X$ of the high pass filter 252X included in the analog deflection angle signals $\theta_{Sa}$ and $\theta_{Sb}$ has a small amplitude $A_X$. Note that the analog deflection angle signal $\theta_X$ is synchronized with an actual deflection angle signal $P_X$ having an amplitude $A_{X0}$ as illustrated in FIG. 5D detected by using a one-dimensional position sensitive detector (PSD) which detects a center of a light spot reflected from the mirror 1, so that a definite relationship between the amplitude $A_X$ of the analog deflection angle signal $\theta_X$ and the amplitude $A_{X0}$ of the actual deflection angle signal $P_X$ is realized and such a relationship is stored in a nonvolatile memory of the control circuit 21 in advance. Also, the one-dimensional PSD is removed in a usual operation mode.

The control circuit 21 rewrites the drive data X1 and X2 to change the amplitudes of the drive voltages $V_{X1}$ and $V_{X2}$ in such a way that the amplitude $A_X$ of the deflection angle signal $\theta_X$ is brought close to a predetermined value corresponding to a predetermined actual deflection angle.

Next, an optical deflection or vertical scanning operation by rocking the mirror 1 with respect to the Y-axis is explained in detail with reference to FIGS. 6A, 6B, 6C and 6D.

Figure 6A:
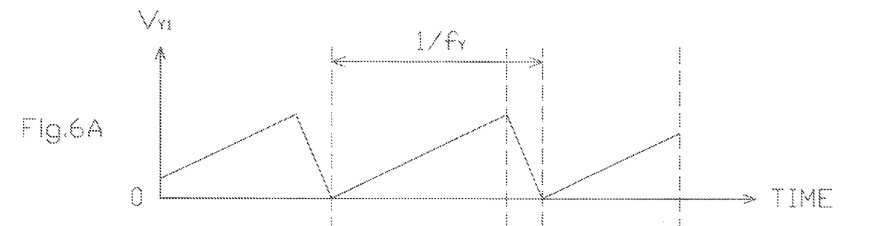
FIGS. 6A, 6B, 6C and 6D are timing diagrams for illustrating examples of the drive voltages $V_{Y1}$, $V_{Y2}$, the deflection angle signal $\theta_Y$ and an actual deflection angle signal $P_Y$, respectively, of FIG. 1.
Figure 6B:
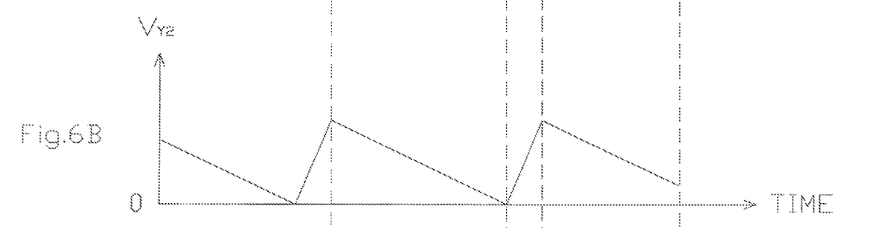

As illustrated in FIGS. 6A and 6B, the drive voltage $V_{Y1}$ based upon the drive data Y1 stored in advance in the nonvolatile memory 223 and the drive voltage $V_{Y2}$ based upon the drive data Y2 stored in advance in the nonvolatile memory 224 are saw-tooth-shaped at a predetermined frequency $f_Y$ such as 60 Hz and symmetrical or opposite in phase to each other with the reference voltage $V_R$ such as 0V. As a result, the piezoelectric cantilevers 5a-1, 5a-3, 5b-1 and 5b-3 and the piezoelectric cantilevers 5a-2, 5a-4, 5b-2 and 5b-4 carry out flexing operations in opposite directions to each other, so that the mirror 1 is rocked with respect to the Y-axis.

Figure 6C:
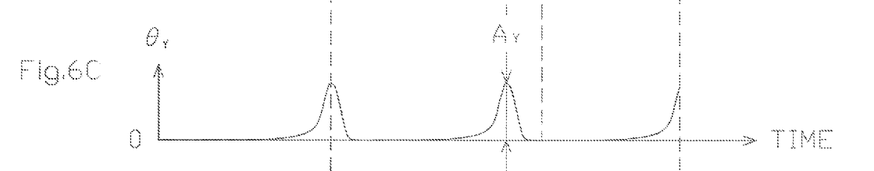
Figure 6D:
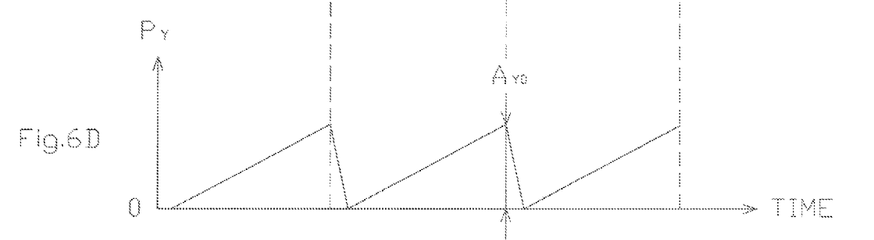

In this case, as illustrated in FIG. 6C, the analog deflection angle signal $\theta_Y$ of the low pass filter 252Y included in the analog deflection angle signals $\theta_{Sa}$ and $\theta_{Sb}$ has a large amplitude $A_Y$. Note that the analog deflection angle signal $\theta_Y$ is synchronized with an actual deflection angle signal $P_Y$ having an amplitude $A_{Y0}$ as illustrated in FIG. 6D detected by using a one-dimensional position sensitive detector (PSD) which detects a center of light spot reflected from the mirror 1, so that a definite relationship between the amplitude $A_Y$ of the analog deflection angle signal $\theta_Y$ and the amplitude $A_{Y0}$ of the actual deflection angle signal $P_Y$ is realized and such a relationship is stored in a nonvolatile memory of the control circuit 21 in advance. Also, the one-dimensional PSD is removed in a usual operation mode.

The control circuit 21 rewrites the drive data Y1 and Y2 to change the amplitudes of the drive voltages $V_{Y1}$ and $V_{Y2}$ in such a way that the amplitude $A_Y$ of the deflection angle signal $\theta_Y$ is brought close to a predetermined value corresponding to a predetermined actual deflection angle.

In the above-described first embodiment, the meander-type piezoelectric actuators 3a and 3b are smaller in size than the meander-type piezoelectric actuators 5a and 5b, so that the meander-type piezoelectric actuators 3a and 3b are easily flexed at a higher frequency than the meander-type piezoelectric actuators 5a and 5b. Thus, the rocking frequency $f_X$ caused by the meander-type piezoelectric actuators 3a and 3b is larger than the rocking frequency $f_Y$ caused by the meander-type piezoelectric actuators 5a and 5b. Particularly, if the rocking frequency $f_X$ of the meander-type piezoelectric actuators 3a and 3b is close to the natural frequency of a mechanically-vibrating system of the mirror 1 with respect to the X-axis depending upon the structure of the inner piezoelectric actuators 3a and 3b, the deflection angle of the mirror 1 with respect to the X-axis can be increased.

Figure 7:
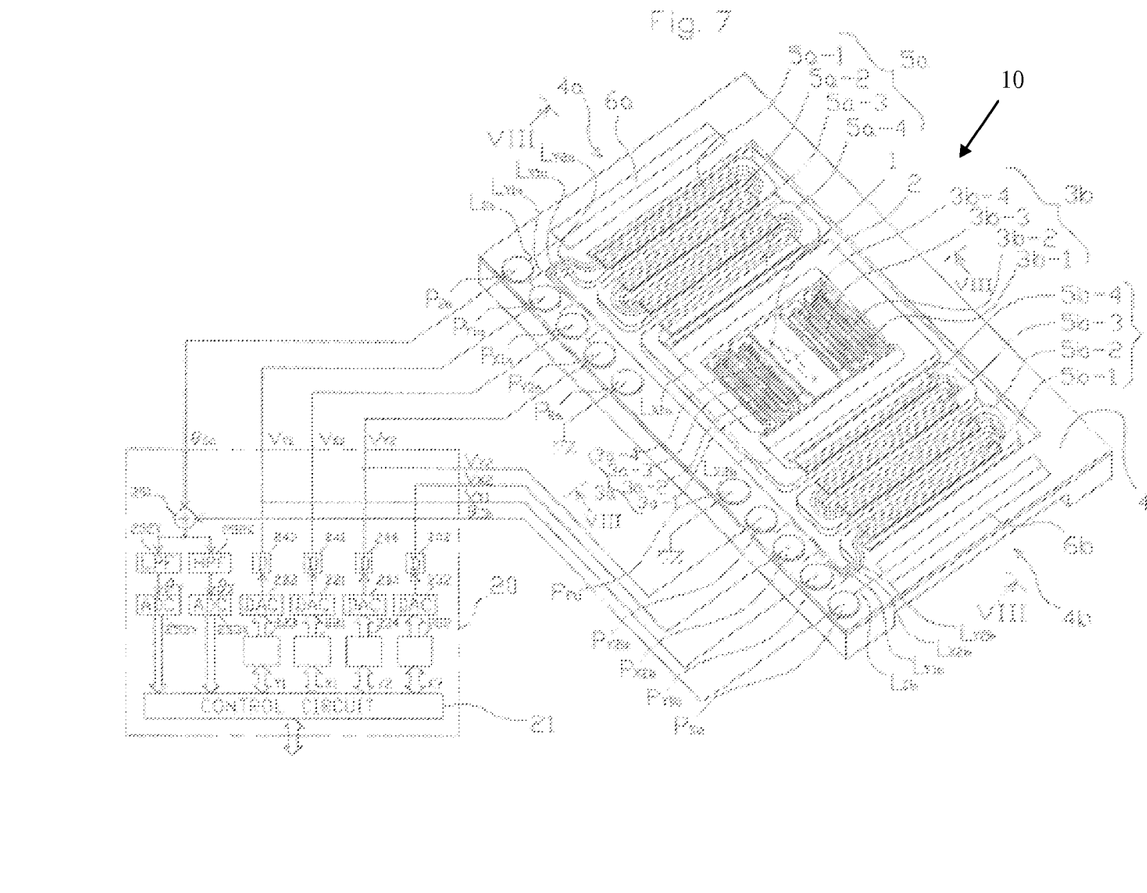
FIG. 7 is a view illustrating a second embodiment of the optical deflector according to the presently disclosed subject matter.
Figure 8:
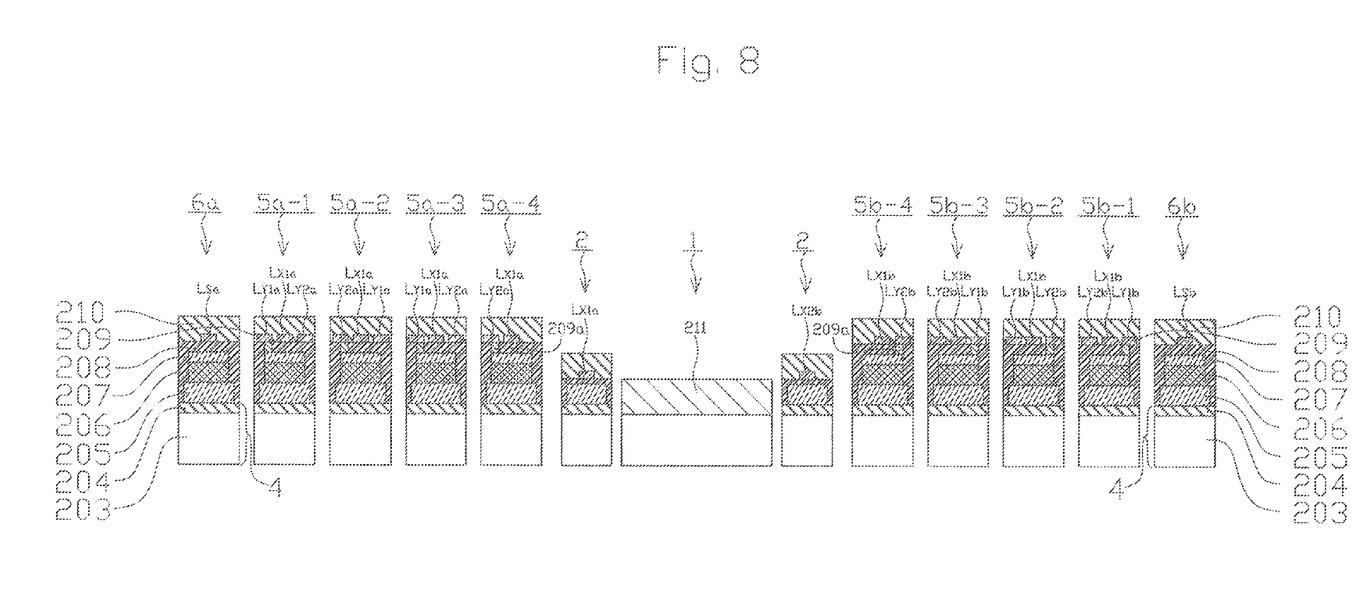
FIG. 8 is a cross-sectional view taken along the line VIII-VIII in FIG. 7.
Figure 9A:
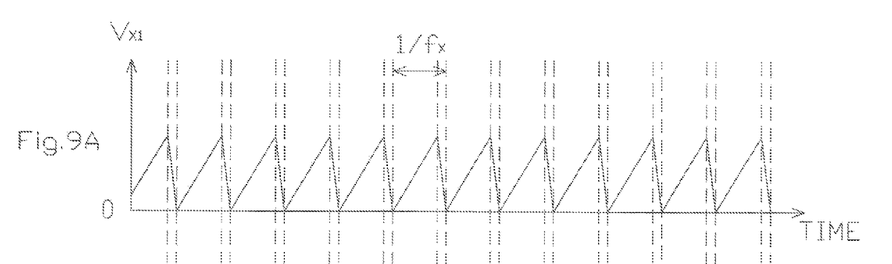
FIGS. 9A, 9B, 9C and 9D are timing diagrams for illustrating examples of the drive voltages $V_{X1}$, $V_{X2}$, the deflection angle signal $\theta_X$ and an actual deflection angle signal $P_X$, respectively, of FIG. 7.
Figure 9B:
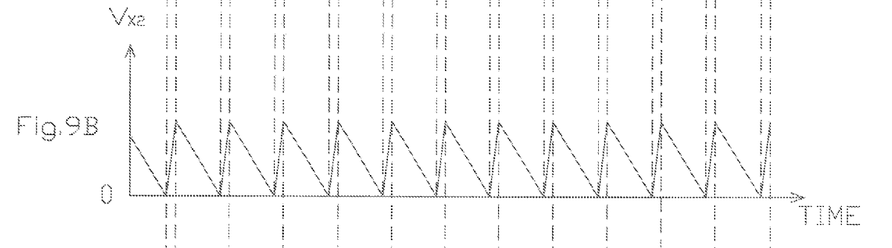
Figure 9C:
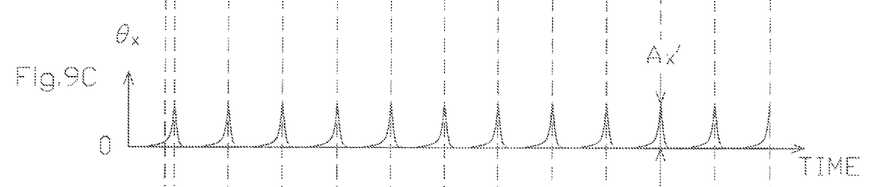
Figure 9D:
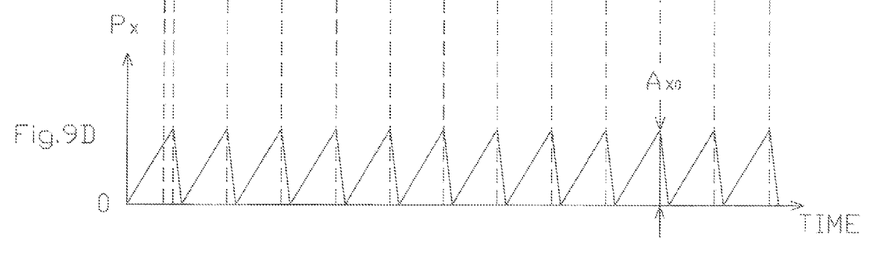
Figure 10A:
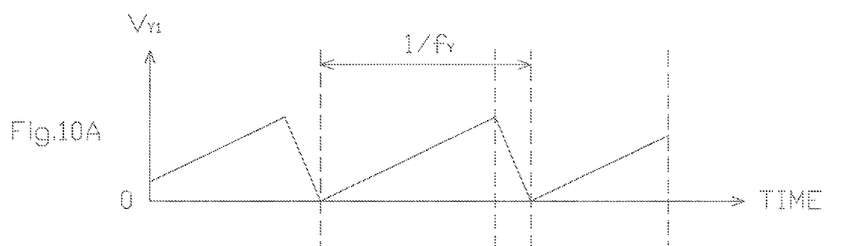
FIGS. 10A, 10B, 10C and 10D are timing diagrams for illustrating examples of the drive voltages $V_{Y1}$, $V_{Y2}$, the deflection angle signal $\theta_Y$ and an actual deflection angle signal $P_Y$, respectively, of FIG. 7.
Figure 10B:
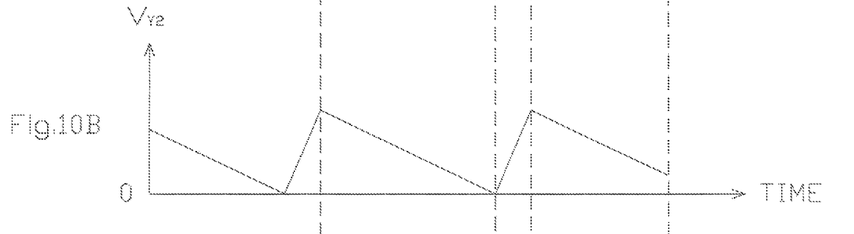
Figure 10C:
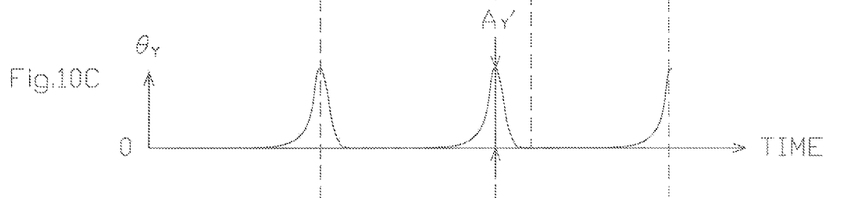
Figure 10D:
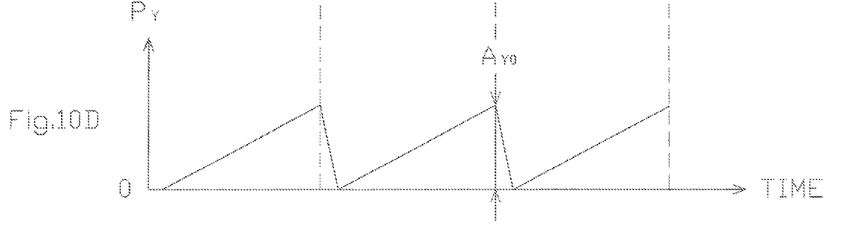

FIG. 7 illustrates a second embodiment of the optical deflector according to the presently disclosed subject matter, and FIG. 8 is a cross-sectional view taken along the VIII-VIII line in FIG. 7. That is, as illustrated in FIGS. 7 and 8, recess portions 4a and 4b are provided in the fixed frame 4 under the piezoelectric sensors 6a and 6b, respectively. In more detail, the thickness of the fixed frame 4 under the piezoelectric sensors 6a and 6b is the same as that of the sum of the monocrystalline silicon active layer 203 and the silicon dioxide layer 204.

In order to maintain the rigidity of the fixed frame 4, the fixed frame 4 is preferably as thick as possible; however, when the fixed frame 4 is too thick, the rocking vibration by the inner piezoelectric actuators 3a and 3b and the rocking vibration by the outer piezoelectric actuators 5a and 5b hardly propagate to the piezoelectric sensors 6a and 6b. Therefore, the provision of the recess portions 4a and 4b enhances the propagation of the above-mentioned rocking vibrations to the piezoelectric sensors 6a and 6b while maintaining the rigidity of the fixed frame 4 to some degree.

As a result, as illustrated in FIGS. 9A, 9B, 9C and 9D which correspond to FIGS. 5A, 5B, 5C and 5D, respectively, the analog deflection angle signal $\theta_X$ included in the analog deflection angle signals $\theta_{Sa}$ and $\theta_{Sb}$ has a relatively larger amplitude $A_X'$ as compared with the amplitude $A_X$ as in FIG.

5C. Also, as illustrated in FIGS. 10A, 10B, 10C and 10D which correspond to FIGS. 6A, 6B, 6C and 6D, respectively, the analog deflection angle signal $\theta_Y$ included in the analog deflection angle signals $\theta_{Sa}$ and $\theta_{Sb}$ has a relatively larger amplitude $A_Y'$ as compared with the amplitude A, as in FIG. 6C. Thus, the rocking vibrations caused by the inner piezoelectric actuators 3a and 3b and the outer piezoelectric actuators 5a and 5b can be sensed by the piezoelectric sensors 6a and 6b with high accuracy.

In the above-described embodiments, AC drive voltages such as saw-tooth-shaped drive voltages are applied to the piezoelectric actuators 3a, 3b, 5a and 5b; however, DC drive voltage can be applied to the piezoelectric actuators 3a, 3b, 5a and 5b. In this case, the flexing amounts of the piezoelectric actuators 3a, 3b, 5a and 5b are linearly changed in accordance with the DC voltages.

Also, in the above-described embodiments, the piezoelectric sensors 6a and 6b are provided on the fixed frame 4 in the vicinity of the outer piezoelectric actuators 5a and 5b. However, the piezoelectric sensors 6a and 6b can be provided on other portions of the fixed frame 4, for example, portions in the vicinity of the inner piezoelectric actuators 3a and 3b, although the sensed rocking vibrations are weakened.

Further, in the above-described embodiments, two piezoelectric sensors 6a and 6b are provided; however, only one piezoelectric sensor, or three or more piezoelectric sensors can be provided on the fixed frame 4.

Figure 11:
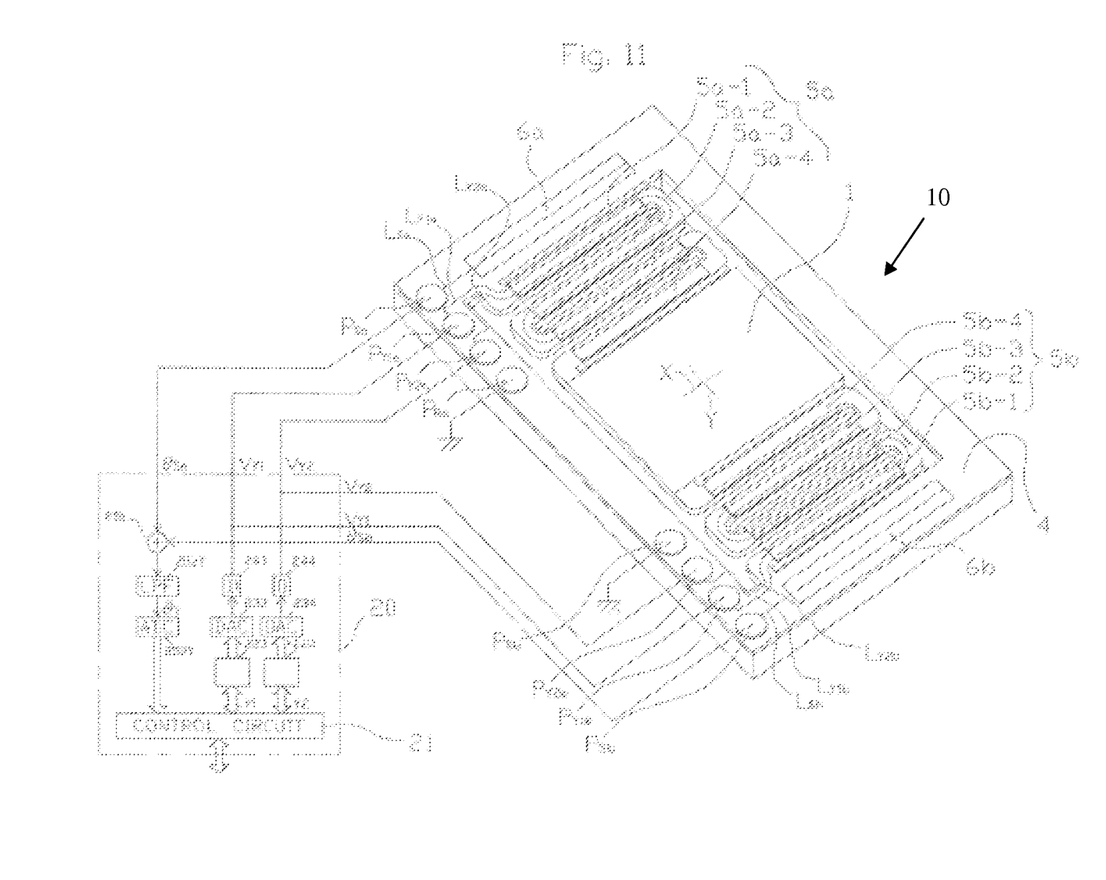
FIG. 11 is a view illustrating a modification of the optical deflector of FIG. 1.

Still further, the presently disclosed subject matter can be applied to a one-dimensional optical deflector as illustrated in FIG. 11. In FIG. 11, the movable frame 2 and the inner piezoelectric actuators 3a and 3b of FIG. 1 are not provided, and the outer piezoelectric actuators 5a and 5b are fixed directly to the mirror 1. Also, in the driver 20, the nonvolatile memories 221 and 222, the DACs 231 and 232, the drive circuits 241 and 242, the high pass filter 252X and the ADC 253X of FIG. 1 are not provided. Further, the recess portions 4a and 4b of FIG. 7 can be provided in the fixed frame 4 under the piezoelectric sensors 6a and 6b.

Further, the presently disclosed subject matter can also be applied to an optical deflector having torsion-bar type inner piezoelectric actuators and/or torsion-bar type outer piezoelectric actuators. For example, the piezoelectric actuators 3a and 3b of FIGS. 1 and 7 and the piezoelectric actuators 5a and 5b can be replaced by a pair of torsion-bar type piezoelectric actuators.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
a mirror;
a fixed frame;
a first piezoelectric actuator, connected to said fixed frame, for rocking said mirror with respect to a first axis of said mirror; and
at least one piezoelectric sensor, provided on said fixed frame, for sensing a rocking vibration of said mirror caused by said first piezoelectric actuator.

2. The optical deflector as set forth in claim 1, wherein said piezoelectric sensor is provided in the vicinity of said first piezoelectric actuator.

3. The optical deflector as set forth in claim 1, wherein a portion of said fixed frame where said piezoelectric sensor is provided is thinner than a portion of said fixed frame where said piezoelectric sensor is not provided.

4. The optical deflector as set forth in claim 1, further comprising:
a movable frame connected to said first piezoelectric actuator opposite to said fixed frame; and
a second piezoelectric actuator, connected between said movable frame and said mirror, for rocking said mirror with respect to a second axis of said mirror,
said piezoelectric sensor being configured to sense a rocking vibration of said mirror caused by said second piezoelectric actuator.

5. The optical deflector as set forth in claim 4, wherein said second axis is perpendicular to said first axis.

6. An optical deflector comprising:
a mirror;
a movable frame supporting said mirror;
a first piezoelectric actuator, connected between said movable frame and said mirror, for rocking said mirror with respect to a first axis of said mirror;
a fixed frame supporting said movable frame;
a second piezoelectric actuator, connected between said fixed frame and said movable frame, for rocking said mirror through said movable frame with respect to a second axis of said mirror; and
at least one piezoelectric sensor provided on said fixed frame for sensing rocking vibrations of said mirror caused by said first and second piezoelectric actuators.

7. The optical deflector as set forth in claim 6, wherein said piezoelectric sensor is provided in the vicinity of said second piezoelectric actuator.

8. The optical deflector as set forth in claim 6, wherein a portion of said fixed frame where said piezoelectric sensor is provided is thinner than a portion of said fixed frame where said piezoelectric sensor is not provided.

9. The optical deflector as set forth in claim 6, wherein said second axis is perpendicular to said first axis.

10. The optical deflector as set forth in claim 6, wherein said first piezoelectric actuator comprises a pair of first meander-type piezoelectric actuators opposite to each other with respect to said second axis,
each of said first meander-type piezoelectric actuators comprising a plurality of piezoelectric cantilevers folded at every cantilever and connected from said movable frame to said mirror, each of said piezoelectric cantilevers being in parallel with said second axis.

11. The optical deflector as set forth in claim 6, wherein said second piezoelectric actuator comprises a pair of second meander-type piezoelectric actuators opposite to each other with respect to said first axis,
each of said second meander-type piezoelectric actuators comprising a plurality of piezoelectric cantilevers folded at every cantilever and connected from said fixed frame to said movable frame, each of said piezoelectric cantilevers being in parallel with said first axis.

12. An optical deflector comprising:
a mirror;
a fixed frame supporting said mirror;
a piezoelectric actuator, connected between said fixed frame and said mirror, for rocking said mirror with respect to a axis of said mirror; and at least one piezoelectric sensor provided on said fixed frame for sensing a rocking vibration of said mirror caused by said piezoelectric actuator.

13. The optical deflector as set forth in claim 12, wherein said piezoelectric sensor is provided in the vicinity of said piezoelectric actuator.

14. The optical deflector as set forth in claim 12, wherein a portion of said fixed frame where said piezoelectric sensor is provided is thinner than a portion of said fixed frame where said piezoelectric sensor is not provided.

15. The optical deflector as set forth in claim 12, wherein said piezoelectric actuator comprises a pair of meander-type piezoelectric actuators opposite to each other with respect to said mirror,     each of said meander-type piezoelectric actuators comprising a plurality of piezoelectric cantilevers folded at every cantilever and connected from said fixed frame to said mirror, each of said piezoelectric cantilevers being perpendicular to said axis.

* * * * *